UNITED STATES PATENT OFFICE.

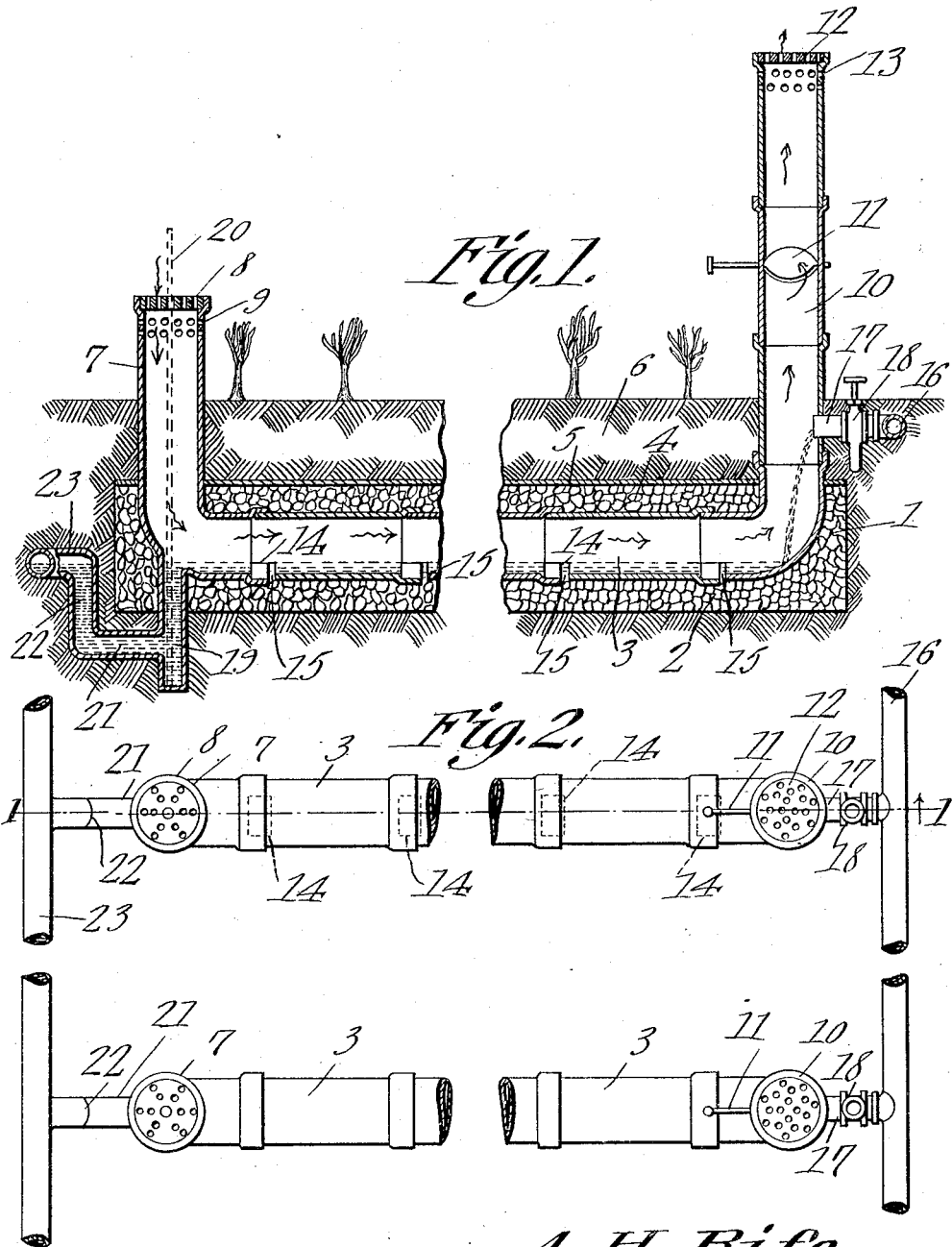

ARCHIBALD HENRY RIFE, OF SAN ANTONIO, TEXAS.

AERATION AND SUBIRRIGATION FOR PROMOTING VEGETATION.

1,200,869.  Specification of Letters Patent.  Patented Oct. 10, 1916.

Application filed June 30, 1913. Serial No. 776,684.

*To all whom it may concern:*

Be it known that I, ARCHIBALD HENRY RIFE, a citizen of the United States, residing at San Antonio, in the county of Bexar and State of Texas, have invented a new and useful Aeration and Subirrigation for Promoting Vegetation, of which the following is a specification.

The present invention relates to the aeration and subirrigation of the soil for promoting vegetation, and it is the object of the invention to provide a novel and improved apparatus whereby air and moisture can be supplied to the subsoil for stimulating the growth of the vegetation.

The invention is illustrated in the accompanying drawing, wherein—

Figure 1 is a vertical section taken on the line 1—1 of Fig. 2, illustrating one of the conduits, portions being broken away. Fig. 2 is a plan view of the apparatus, portions being broken away, In carrying out the invention, the field to be irrigated and aerated from the subsoil, has embedded therein the horizontal portions of any suitable number of parallel conduits 3 formed from tile or other sections placed end to end. Each conduit is placed within a trench 1 dug in the soil 6, the bottom of the trench being filled with broken stone or other granular material 2 upon which the conduit 3 is disposed, and a similar filling of broken stone or other granular material 4 is disposed within the trench above the horizontal portion of the conduit 3. A pervious layer of cement 5 is preferably placed over the granular filling 4, to prevent the roots of the vegetation above the conduit from entering the granular material. Said cement, however, is pervious to allow the moisture to rise by capillary attraction. The conduits 3 are spaced at suitable intervals, whereby the vegetation above and between the conduits will be supplied with air and moisture, and the conduits are placed a suitable distance below the surface of the soil.

The terminals of each conduit project angularly upward to provide a relatively short stand pipe 7 at one end of the conduit, and a relatively long or tall stand pipe 10 at the other end of the conduit, said stand pipes projecting above the surface of the soil. The upper ends of the stand pipes 7 and 10 are closed by the apertured disks or plates 8 and 12, respectively, to exclude birds, rodents, or other foreign objects from the conduit, but to allow air to circulate within the stand pipes. The stand pipes are provided adjacent their upper ends with air apertures or openings 9 and 13, respectively, to facilitate the circulation of air within the stand pipes. The conduits are adapted to contain air, and if desired, a circulation of air can be established by any suitable means through the conduits. A damper 11 is pivoted within each stand pipe 10 whereby the damper can be operated for controlling the flow of air within the conduit.

The ends of the tiles of the horizontal portion of each conduit are provided with cut-away portions 14 providing lower slots 15, said slots being disposed transversely, and allowing the water which is within the conduit to flow downwardly into the granular material, whereby the water will be raised by capillary attraction to be supplied to the roots of growing plants. This arrangement also permits the air to circulate between the conduits and granular material, whereby the circulation of air, whether artificial or natural, will materially benefit the growth of the plants, it being evident, that the granular filling will permit the air to flow between the stones or particles whereby the air can pass to the soil from the filling.

In order to supply water to the conduits, a water supply pipe 16 extends at right angles to the conduits, adjacent the stand pipes 10, and is provided with nozzles 17 projecting into said stand pipes said nozzles having controlling valves 18. The valves 18 can thus be opened to allow the water to flow from the nozzles 17 into the conduits. The attendant can thus fill the conduits with water, from time to time, so that the water will drain into the granular material to keep the same supplied with moisture.

In order to enable the surplus water to be drained from the conduits, it being noted that it is not desirable to have the conduits completely filled with water, a drain pipe 23 parallel with the pipe 16 is disposed adjacent the opposite ends of the conduits at right angles therewith, and adjacent or intersecting the lines of the bottoms of the conduits. The drain pipe 23 is connected to the conduits 3 at the lower ends of the stand pipes 7 by means of U-shaped traps embodying the limbs 19 connected to the conduits, the limbs 22 connected to the pipe 23, and the cross portions 21 connecting said limbs. Said traps will naturally be filled with water ordinarily, to prevent the air circulating between the conduits 3 and pipe 23. Since the pipe 23 is disposed at a lower level than the axes and tops of the horizontal portions of the conduits 3, should the water level within the conduits be too high, the water can flow through the traps into the pipe 23, to be drained off. In this manner, should the attendant allow too much water to flow into the conduits the surplus water will be drained off, and that water which remains within the conduits will be drained into the granular material. This prevents an excessive amount of water accumulating within the conduits and granular material, as would be objectionable, since too much water is detrimental to plant growth, as well as a scarcity of moisture. Furthermore, if the conduits contain too much water, this reduces the amount of air within the conduits and would naturally prevent air flowing through the slots 15. When the apparatus is used on hillsides, the conduits 3 are disposed in different horizontal planes, and the pipes 16 and 23 can be inclined to extend properly from one conduit to the next. A testing rod 20 can be moved downwardly through each stand pipe 7 into the limb 19 of the respective trap, to ascertain the depth of the water.

What is claimed is:

1. In an apparatus of the character described, a conduit having a horizontal portion embedded in the soil and provided with lower openings, the conduit having an upwardly projecting stand pipe at one end, a drain pipe disposed below the axis of said conduit, and a U-shaped trap connecting said drain pipe and conduit, one limb of said trap being disposed below said stand pipe.

2. In an apparatus of the character described, conduits having horizontal portions embedded in the soil and provided with lower openings, said conduits having upwardly projecting terminal stand pipes, a drain pipe disposed at right angles with the conduits at certain ends thereof, said drain pipe being disposed below the axes of said conduits, and U-shaped traps connecting said drain pipe and conduits and having certain limbs disposed below the respective stand pipes.

In testimony that I claim the foregoing as my own, I have hereto affixed my signature in the presence of two witnesses.

ARCHIE HENRY RIFE.

Witnesses:
G. F. WATSON,
G. W. HENRICHSON.

Copies of this patent may be obtained for five cents each, by addressing the "Commissioner of Patents, Washington, D. C."